United States Patent [19]

Lloyd et al.

[11] 4,072,229
[45] Feb. 7, 1978

[54] RECORD ALBUM COVER

[76] Inventors: Peter Lloyd, 11049 Blix St., North Hollywood, Calif. 91602; Bob Zoell, 14547 Greenleaf St., Sherman Oaks, Calif. 91403

[21] Appl. No.: 659,680

[22] Filed: Feb. 20, 1976

[51] Int. Cl.² ............................................. B65D 85/30
[52] U.S. Cl. ..................................... 206/309; 206/457
[58] Field of Search .............................. 206/309–313, 206/484, 491, 497, 457, 525; 229/68 R; 312/10, 12–13

[56] References Cited

U.S. PATENT DOCUMENTS

| 2,777,574 | 1/1957 | Brody ................................... 206/313 |
| 3,516,598 | 6/1970 | de Freitas Martins .......... 206/309 X |
| 3,547,342 | 12/1970 | Smith et al. ..................... 206/309 X |
| 3,939,970 | 2/1976 | Schoenberger ................. 206/457 X |

FOREIGN PATENT DOCUMENTS

| 294,696 | 7/1928 | United Kingdom ................ 206/310 |

*Primary Examiner*—Steven E. Lipman
*Attorney, Agent, or Firm*—Gerald S. Geren

[57] ABSTRACT

A record album having a circular or disc-shaped plastic cover is disclosed herein. The cover is fabricated from a pair of disc-shaped plastic sheets which are sealed along about one-half of the peripheral edge so as to define a pocket for receiving the record. Indicia may be applied to the cover so as to provide the cover with a record-appearing surface.

2 Claims, 3 Drawing Figures

RECORD ALBUM COVER

BACKGROUND OF THE INVENTION

This invention relates to phonograph record albums and, more particularly, to the cover or jacket for the record.

Presently phonograph records are normally sold in albums having square-shaped paper or cardboard jackets or covers. The reason for the square shape is that it is the easiest shape to form by bending, folding or scoring the paper or cardboard. Moreover, the square-shaped covers have traditionally been preferred by manufacturers since they lend themselves to conventional box shipping containers and are preferred by retailers since they lend themselves to stacking or arrangement in a conventional bin.

Unfortunately, these traditional limitations of a square paper cover have limited the creative aspects in designing new covers. Furthermore, existing covers have not taken into account the new materials and manufacturing techniques available.

It is therefore an object of this invention to provide a cover construction which lends itself to new creative expressions.

It is another object of this invention to provide a cover construction which can utilize new materials and manufacturing techniques.

These and other objects of this invention will become apparent from the following description and appended claims.

SUMMARY OF THE INVENTION

There is provided by virtue of this invention a circular record cover having a pair of sealable disc-shaped plastic sheets which are joined along about one-half of the peripheral edge so as to define a pocket-like construction for receiving the records. Indicia can be applied on one or both sides of the cover so as to make the package appear as a record. In addition to the record, stiffeners are fitted into the cover to protect the record. The album or package is finished by enclosure in a shrink-plastic package.

DESCRIPTION OF THE PREFERRED EMBODIMENT

Figure 1:
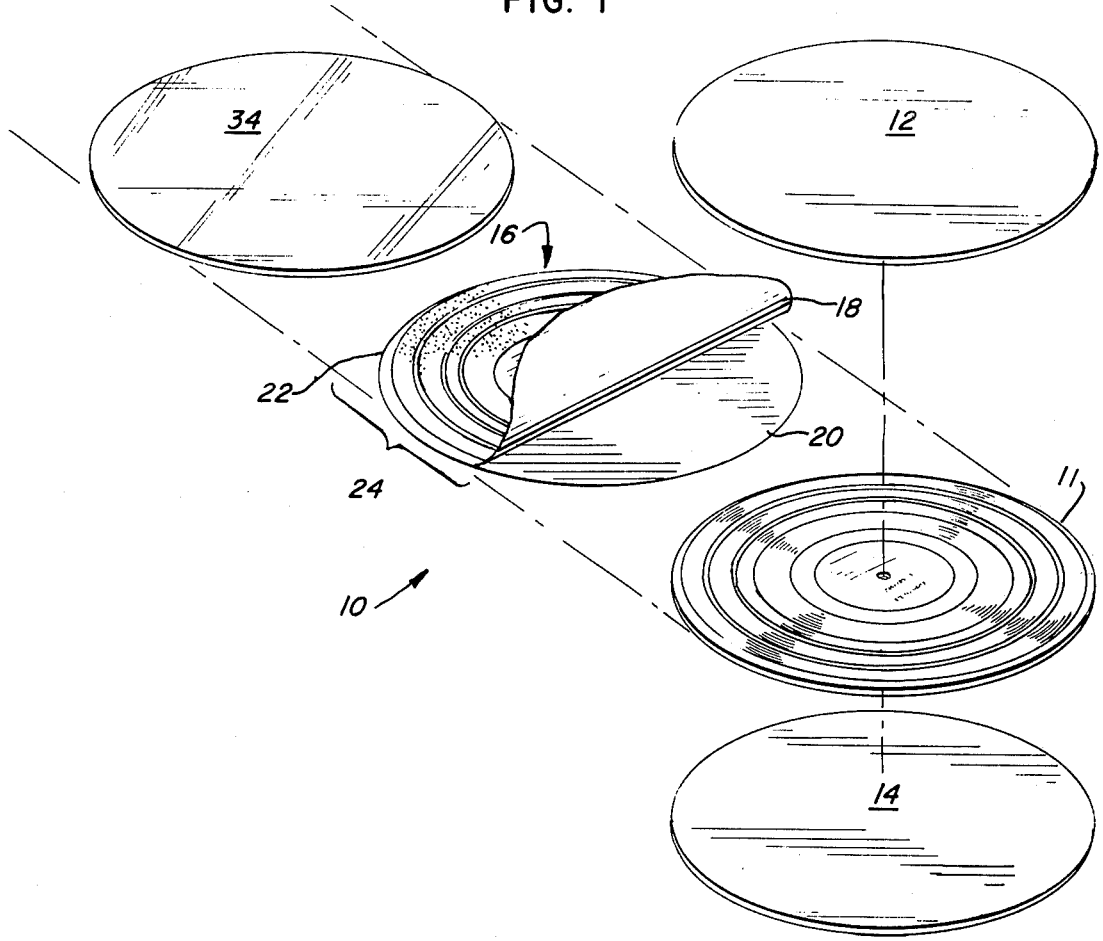
FIG. 1 is an exploded perspective view showing the album.
Figure 3:
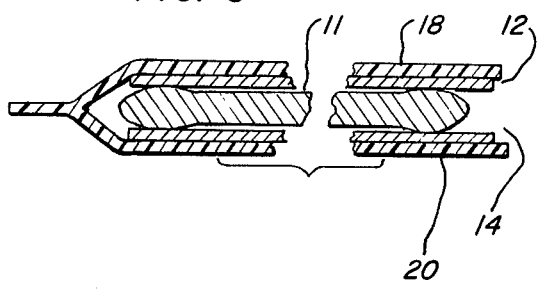
FIG. 3 is a sectional view taken along line 3—3 of FIG. 2 and showing the interior of the album.
Figure 2:
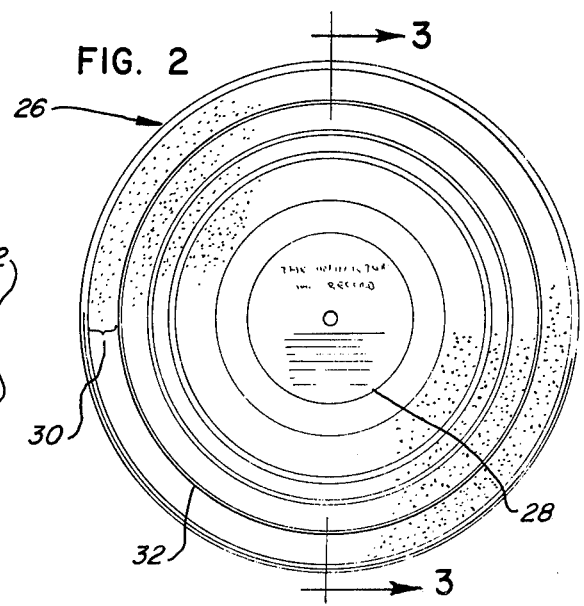
FIG. 2 is a front elevational view of the cover.

Referring to the drawings, there is shown a phonograph album 10 generally. The album includes a record 11, which is positioned for engagement by a pair of disc-shaped stiffeners 12 and 14. The stiffeners are of cardboard or paper, are of about the same diameter as the record, and act to minimize bending of the records.

The cover 16 is fabricated from two disc-shaped sheets of plastic 18 and 20. These two discs are cut from sheets of polyvinyl chloride. The sheets 18 and 20 have a diameter larger than the record and are joined together by a peripheral edge seal 24. The seal extends for approximately halfway around the circumference of the cover. Since the discs are made of polyvinyl chloride, they are joined by "sonic welding" at radio frequencies. It will be appreciated that the seal line can be continuous, as shown, or in spaced segments about one-half of the circumference. The sealing of one-half of the circumference defines: (1) a pocket-like end 24 for receiving the record 11 and stiffeners 12 and 14 and (2) an open-mouth 26 for insertion of the record into the pocket-like end.

The polyvinyl chloride is black in color and indicia may be applied thereto. Thus, a representation of a record label 28 or indeed an actual label may be applied to the cover at its center. The remainder of the surface may be decorated so as to provide the appearance of record bands, such as 30, with the spacing bands, such as 32, therebetween.

After the cover 16 is fabricated and the indicia applied and after the record 11 and stiffeners 12 and 14 are inserted into the cover, an outer shrink-plastic covering 34 is applied so as to complete the album.

This particular embodiment has a unique construction and appearance which readily distinguishes it from the ordinary square cardboard albums.

It will be appreciated that changes and modifications can be made to this embodiment without departing from the spirit and scope of this invention.

What is claimed and desired to be secured by Letters Patent of the United States is:

1. A cover for a phonograph record comprising: two circularly shaped discs formed from black, sealable, shiny and flexible polyvinyl chloride, each disc having a diameter greater than the diameter of a phonograph record, said discs being continuously sealed together for about one-half their circumference so as to provide an open end into which a phonograph record may be inserted and a closed, pocket-like end for receiving a phonograph record, a pair of circular, disc-shaped stiffeners for rigidifying the cover and protecting the phonographic record, the stiffeners being of a diameter less than the diameter of the cover, and indicia applied to at least one side of the cover, the indicia including record bands, spacing bands and a concentrically placed record label, the indicia providing a record cover which substantially corresponds to a phonograph record housed within the cover, whereby the cover of the phonograph record simulates the phonograph record itself.

2. A cover as in claim 1 wherein the discs are sonic sealed for about one-half their circumference to provide the open and closed ends.

* * * * *